United States Patent [19]

Batchelder

[11] 4,390,403

[45] Jun. 28, 1983

[54] METHOD AND APPARATUS FOR DIELECTROPHORETIC MANIPULATION OF CHEMICAL SPECIES

[76] Inventor: J. Samuel Batchelder, 85 Allison Rd., Katonah, N.Y. 10536

[21] Appl. No.: 286,387

[22] Filed: Jul. 24, 1981

[51] Int. Cl.[3] .................... B01D 57/02; C25B 7/00; C25D 13/00

[52] U.S. Cl. .................... 204/180 R; 204/180 P

[58] Field of Search .................... 204/180 P, 180 R

[56] References Cited

U.S. PATENT DOCUMENTS

| | | | |
|---|---|---|---|
| 2,835,632 | 5/1958 | Kollsman | 204/180 R |
| 2,872,407 | 3/1959 | Kollsman | 204/180 R |
| 3,152,062 | 10/1964 | Clusius et al. | 204/180 P |
| 3,966,575 | 6/1976 | Candor | 204/180 R |
| 4,001,102 | 1/1977 | Batha et al. | 204/180 R |
| 4,146,454 | 3/1979 | Haber | 204/180 R |
| 4,164,460 | 8/1979 | Jordan et al. | 204/180 R |
| 4,181,589 | 1/1980 | Frosch | 204/180 R |
| 4,201,643 | 5/1980 | Holman et al. | 204/180 R |
| 4,226,688 | 10/1980 | Kedem et al. | 204/180 R |

*Primary Examiner*—Arthur P. Demers

*Attorney, Agent, or Firm*—Parmelee, Bollinger & Bramblett

[57] ABSTRACT

The present invention provides method and apparatus for manipulating one or more chemicals within a reaction chamber or housing by dielectrophoretic forces. At least two materials, one of which is a chemical to be manipulated, are provided within the housing. The materials have different dielectric constants. A non-uniform electrical field is applied to the materials within the housing and, as a result of dielectrophoretic forces generated by the applied field, the relative positions of the materials are varied. Accordingly, a chemical can be selectively manipulated to different positions within the housing as, for example, to a catalyst or chemical analyzer located within the housing. The present apparatus may also be used to simultaneously manipulate more than one chemical to mix, or induce a chemical reaction, between the different chemicals in the housing.

20 Claims, 12 Drawing Figures

Fig. 1.
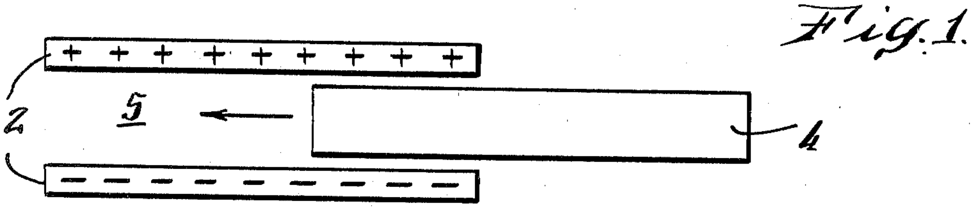
Fig. 2.
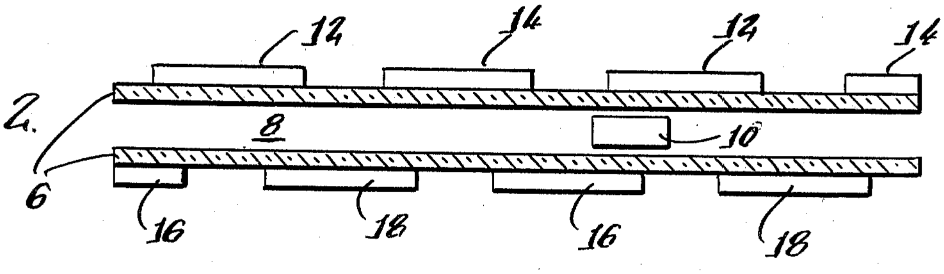
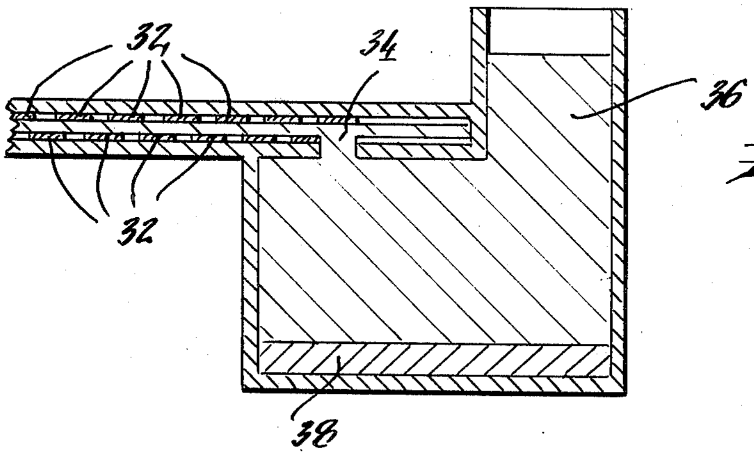
Fig. 4.
Fig. 5.
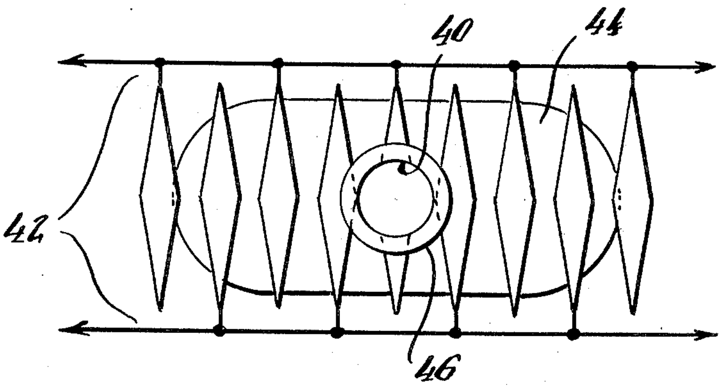
Fig. 5A.
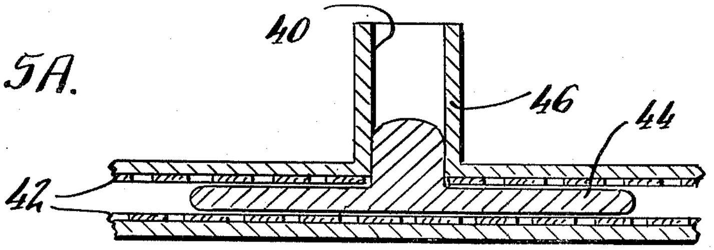

Fig. 3.
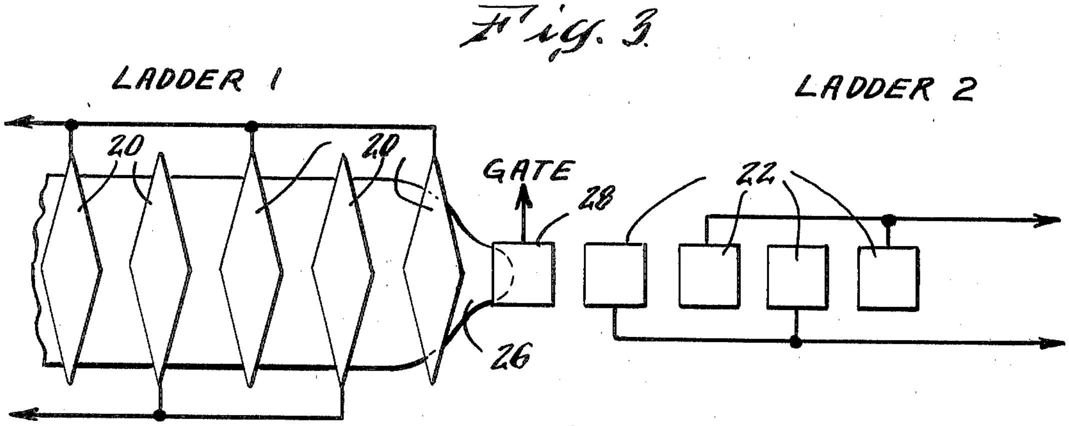
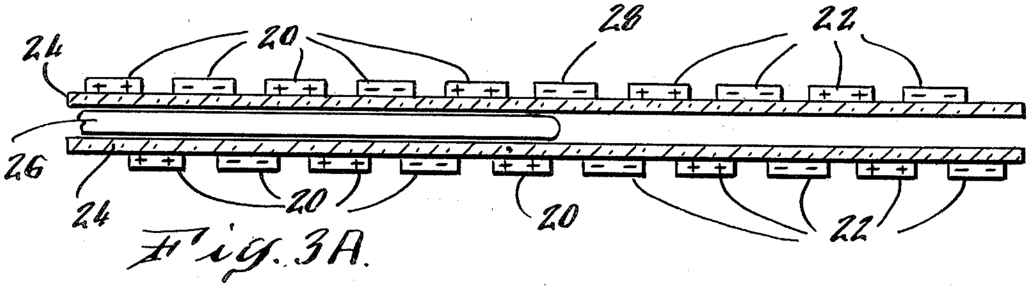
Fig. 3A.
Fig. 3B.
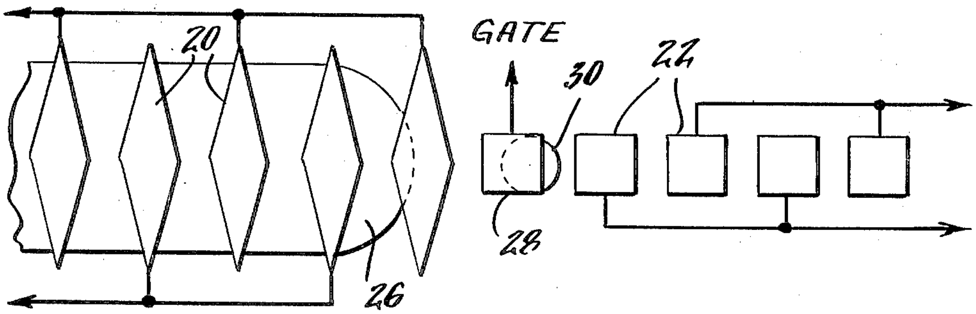
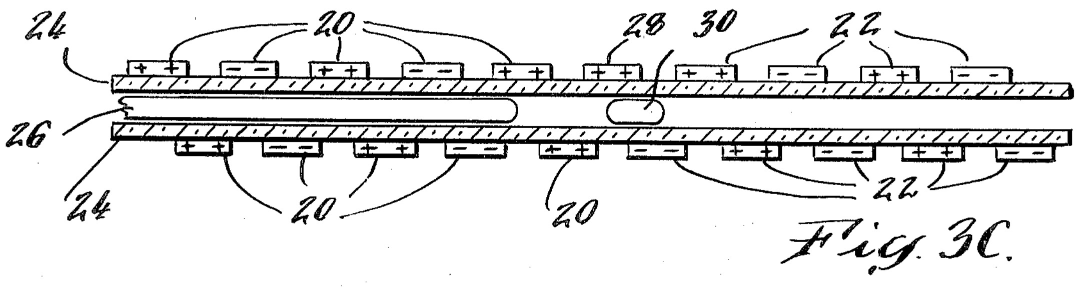
Fig. 3C.

METHOD AND APPARATUS FOR DIELECTROPHORETIC MANIPULATION OF CHEMICAL SPECIES

BACKGROUND OF THE INVENTION

The present invention is based on the phenomenon of dielectrophoresis—the translational motion of neutral matter caused by polarization effects in a non-uniform electric field. The dielectrophoresis phenomenon was first recorded over 2500 years ago when it was discovered that rubbed amber attracts bits of fluff and other matter. Over 300 years ago, it was observed that water droplets change shape as they approach a charged piece of amber. The basic concept of dielectrophoresis is examined in detail in a text entitled Dielectrophoresis by Herbert H. Pohl, published in 1978 by the Cambridge University Press. Further discussion of this phenomenon also can be found in an article by W. F. Pickard entitled "Electrical Force Effects in Dielectric Liquids", *Progress in Dielectrics* 6 (1965)—J. B. Birks and J. Hart, Editors.

All known practical applications of the dielectrophoresis phenomenon have been directed to either particle separators or clutches. For example, U.S. Pat. No. 1,533,711 discloses a dielectrophoretic device that removes water from oil; U.S. Pat. No. 2,086,666 discloses a dielectrophoretic device which removes wax from oil; U.S. Pat. No. 2,665,246 discloses a dielectrophoretic separator used in a sludge treatment process, U.S. Pat. No. 2,914,453 provides for separation of solid polymeric material from fluid solvents; U.S. Pat. No. 3,162,592 provides for separation of biological cells; U.S. Pat. No. 3,197,393 discloses a separator using centripetal acceleration and the dielectrophoretic phenomenon; U.S. Pat. No. 3,304,251 discloses dielectrophoretic separation of wax from oil; U.S. Pat. No. 3,431,441 provides a dielectrophoretic separator which removes polarizable molecules from plasma; U.S. Pat. No. 3,980,541 discloses separation of water from fluid; and U.S. Pat. No. 4,164,460 provides for removal of particles from a liquid. U.S. Pat. Nos. 3,687,834; 3,795,605; 3,966,575; and 4,057,482 disclose other dielectrophoretic separators for removing particulates and water from a fluid. Other separators, not necessarily dielectrophoretic separators, are disclosed in U.S. Pat. Nos. 465,822; 895,729; 3,247,091 and 4,001,102.

U.S. Pat. No. 2,417,850 discloses a clutch mechanism using the dielectrophoretic phenomenon.

The object of the present invention is to provide a reaction chamber or housing in which one or more chemicals can be selectively manipulated to different locations within the chamber using the dielectrophoresis phenomenon. A variety of apparatus for performing chemical manipulations are known to the art. Such apparatus provide mechanical manipulation (such as by pressurized fluid transfer), inertial or gravimetric manipulation (such as by centrifigation), or phase separation (such as by distillation). Automated chemical analysis can be accomplished, for example, by automatic titrators, which substitute electrically operated components, such as solenoid driven stopcocks, for operations normally performed manually. Automated chemical synthesizers as, for example, protein sequencers are also known.

The present invention provides a technique for electronic manipulation of chemicals using the phenomenon of dielectrophoresis. Dielectrophoretic forces are used to selectively position, mix, separate and transport one or more chemical species within a housing. For example, chemical species may be transported to a typical reaction site, such as heated catalytic surfaces to induce a chemical reaction. Likewise, chemicals may be transported to analytical devices, such as absorption spectrometers. Dielectrophoretic manipulation of one or more chemicals is well suited for automatic control such as, for example, direct computer control.

SUMMARY OF THE INVENTION

The present invention provides method and apparatus for manipulating one or more chemical species within a housing. The housing contains at least two materials having different dielectric constants, one of the two materials corresponding to the chemical species to be manipulated. Means for applying a non-uniform electrical field to the materials within the housing are provided. The dielectrophoretic forces resulting from the applied non-uniform field vary the relative positions of the materials within the housing. Accordingly, the non-uniform field is used to manipulate the location of the chemical species within the housing. The species may be transported to different regions in which, for example, it may be analyzed or induced to react with other chemicals. Additionally, two or more chemicals can be manipulated within the housing for mixing or other reactions.

BRIEF DESCRIPTION OF THE DRAWINGS

FIG. 1 of the drawings diagrammatically illustrates charged parallel capacitor plates causing movement of a slab of material as a result of dielectrophoretic forces;

FIG. 2 diagrammatically illustrates a dielectric material disposed between a plurality of different pairs of capacitor plates;

FIG. 3 is a top plan view of a gate electrode in accordance with the present invention;

FIG. 3A is a side elevational view, in section, of the gate electrode of FIG. 3;

FIG. 3B is a top plan view of a gate electrode similar to that shown in FIG. 3 with the charges on the capacitor plates modified from that shown in FIG. 3;

FIG. 3C is a side elevational view, in section, of the gate electrode of FIG. 3B;

FIG. 4 is a sectional view of a structure for dielectrophoretically ejecting material from a housing in accordance with the present invention;

FIG. 5 is a top plan view of a second structure for dielectrophoretically inputting material into a housing;

FIG. 5A is a side elevational view, in section, of the structure of FIG. 5;

DISCUSSION OF THE PREFERRED EMBODIMENTS

Figure 2A:
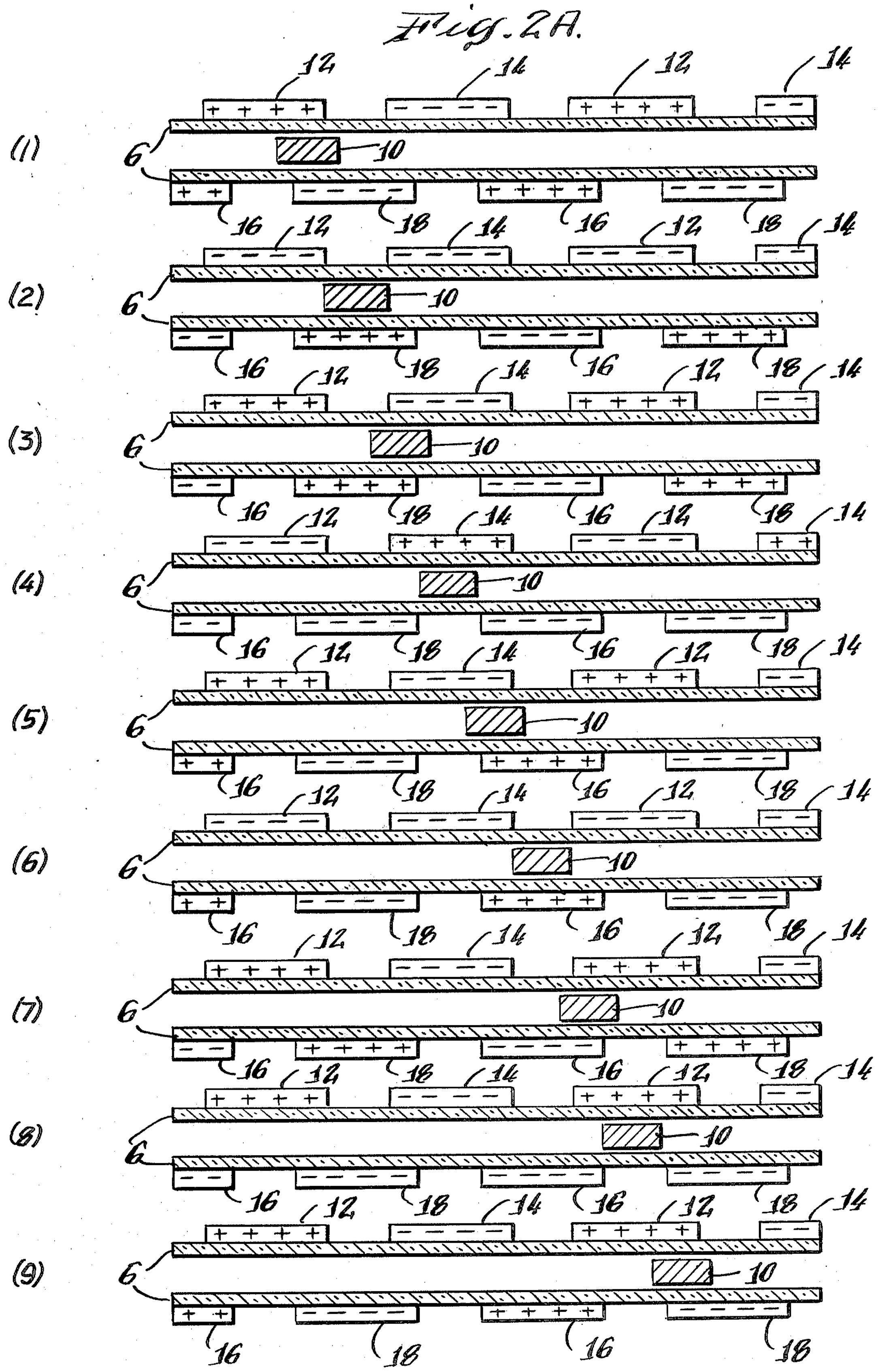
FIG. 2A diagrammatically illustrates sequential movement of the dielectric material of FIG. 2 by varying the charges on the pairs of capacitor plates.

This present invention utilizes the phenomenon known as dielectrophoresis, or the motion of electrically neutral matter in non-uniform electric fields caused by polarization effects in the neutral matter. Matter is polarizable to the extent that electric charges are mobile inside the material, specifically to the extent that the electric charge can respond to external electric fields. The polarizability of material, at low frequencies, is measured by the dielectric constant. For example, the dielectric constant of a vacuum, which has no mobile charges, is one, and the dielectric constant of a metal, which contains charges that are so mobile that the material is termed a conductor, is infinite. Any gas, liquid, or solid is therefore a dielectric material. It is known that a material with a higher dielectric constant will experience a force tending to move it into a stronger electric field and, in the process, it will displace a material with a lower dielectric constant.

Such a process is shown in FIG. 1; a parallel plate capacitor 2, with some potential difference between its two plates, will contain an electric field between the two plates. A slab of material 4 having a higher dielectric constant than the surrounding medium 5 will be attracted into the region between the capacitor plates. The slab will move into the region between the plates at a rate determined by a variety of factors: its dielectric constant; the dielectric constant of the surrounding material; the voltage and geometry of the capacitor; the viscosity of the surrounding material; and any other forces which may be acting on the slab, such as gravity and surface interactions.

The dielectric constant of a conductor is not a directly measurable quantity. For the purposes of this discussion, conducting materials will be considered as being subject to dielectrophoretic forces. Justification for this assumption is that the induced polarization on, for example, a non-conducting dielectric sphere in a uniform field can be calculated analytically. The dielectric constant in this expression can then be allowed to approach infinity in absolute value. In other words, the dielectric sphere becomes a conductor and the expression for the induced polarization remains well defined. Since it is the induced polarization which in turn interacts with the external field to create dielectrophoretic motion, a conductor can be considered subject to a dielectrophoretic interaction.

In the following discussion, the material being manipulated will be interchangeably referred to as a dielectric slab, a dielectric bubble, or a dielectric particle. Each refers to an isolated region in space containing a material of substantially different dielectric constant than its surroundings. The manipulated material can be a solid, a liquid, or a gas.

Alternative electrode configurations create bubble movement perpendicular to the plane of the electrode array rather than parallel to it. Since the slab is attracted to regions of higher electric field density, a field between two electrodes of dissimilar geometry will cause the slab to move towards the smaller electrode.

The potentials of various electrodes have been denoted by the d.c. voltage levels V+ and V− for the sake of clarity. The sign of the field, which is determined by the relative potentials on both electrodes, is immaterial, because for electrically neutral bubbles of dielectric material, the force that they experience due to the voltages on the electrodes is attractive and independent of sign. In practice, dielectric media have some non-negligible electronic or ionic conductivity. Ions in the surrounding medium will migrate under the influence of the electrode fields and configure themselves so as to shield the dielectric bubble from these external fields. This is usually an undesirable effect, so that the actual voltages applied to the electrodes is held constant in absolute value but also oscillates in time at a rate sufficient to decrease ionic shielding to an acceptable level.

Although reference has been made to a higher dielectric bubble surrounded by a lower dielectric medium, the opposite is also possible. If a bubble of a lower dielectric medium is immersed in a higher dielectric surrounding, it will tend to be repelled by dielectrophoretic forces.

Elaborating on the geometry of FIG. 1, instead of a single pair of capacitor plates, a sequence of capacitive electrodes may be provided, as shown in FIG. 2. Two insulating plates 6 in a surrounding medium 8 enclose a bubble 10 of a higher dielectric material and carry on their non-opposed surfaces electrodes 12, 14, 16 and 18. Those electrodes which carry the same reference numeral are electrically connected. This may be referred to as a ladder electrode geometry. With a voltage V+ applied to electrodes 12 and 16 and V− applied to electrodes 14 and 18, the bubble 10 of higher dielectric material will have a stable position between electrodes 12 and 18. If V+ is applied to electrode 18 and V− to electrodes 12, 14 and 16, the bubble 10 of high dielectric material (hereafter referred to as the bubble) moves to the right, finding a stable position over electrode 18, as shown in the second diagram from the top of FIG. 2A. This process can be continued, as shown by the sequence of diagrams in FIG. 2A, by applying the voltages given in Table 1 below, to the various electrodes, causing the bubble to move reversibly to the right. The voltages on the electrodes in the ninth step are the same as in the first step, indicating that the system has returned to its initial condition with the exception that the bubble has been moved to the right.

TABLE 1

| Electrode | Step 1 | 2 | 3 | 4 | 5 | 6 | 7 | 8 | 9 |
|---|---|---|---|---|---|---|---|---|---|
| 12 | V+ | V− | V+ | V− | V+ | V− | V+ | V+ | V+ |
| 14 | V− | V− | V− | V+ | V− | V− | V− | V− | V− |
| 16 | V+ | V− | V− | V− | V+ | V+ | V− | V− | V+ |
| 18 | V− | V+ | V+ | V− | V− | V− | V+ | V− | V− |

Reference is also made to co-pending application Ser. No. 265,637 filed May 20, 1981, entitled "Method and Apparatus for Providing a Dielectrophoretic Display of Visual Information", the disclosure of which is incorporated herein by reference, for an example of a half-ladder electrode array.

Note that FIGS. 2 and 2A include insulators placed between the electrodes and the mobile dielectric materials. These are not necessary if the conductivity of the dielectric media is low enough, and if there are no detrimental interactions between the electrode material and the dielectric media.

The electrode arrays pictured in FIGS. 1–2 allow for manipulation of the bubble position in only one dimension. However, it is clear that such techniques can be extended to give manipulation capacity in two or three dimensions as well. The two pairs of electrodes in FIG. 2 can be extended to an arbitrary number of electrode pairs in two dimensions. In addition, multiple arrays of electrodes can allow for the vertical movement previously described.

Special consideration must be placed on the effects of surface wetting or adhesion, surface tension, and viscosity in a dielectrophoretic manipulator. To first order, all electrically neutral materials attract each other, to a greater or lesser degree, by the Van der Waals interaction, which is the microscopic counterpart of the dielectrophoretic interaction. Because of this attraction, any material which is to be manipulated will tend to be attracted to the containing surfaces of the device. That attraction can cause adhesion to, or in the case of fluids, wetting of the containing surfaces by the material to be manipulated, which degrades the performance of the device. To overcome this effect, a secondary material may be placed between the material being manipulated and the containing surfaces, with the characteristic that this secondary material is more attractive to the material being manipulated than the containing surfaces are. This secondary material can take the form of a lubricant that coats the containing surfaces, or of a low viscosity liquid (or gas) that fills the volume between the containing surfaces. For example, if water, with a dielectric constant of 76, is the material to be manipulated, and glass insulators form the containing surfaces, a surrounding fluid that is effective at preventing the water from wetting the glass is heptane, with a dielectric constant of 1.9, containing five percent octyl alcohol. It is important to keep the viscosity of the surrounding material as low as possible to afford the least resistance to the movement of the material being manipulated. Finally, if the material being manipulated is fluid, there may be a requirement to generate small bubbles from larger ones. This can be accomplished by at least four techniques. Moving a fluid bubble rapidly in a viscous medium causes the larger bubble to break down into smaller ones due to viscous drag. The velocity required to perform this fissioning process depends upon the surface energy between the bubble and the surrounding medium. For example, in the case of water in heptane, the addition of two percent of the detergent Triton-x 100 to the water lowers the surface energy between the water and the heptane from more than thirty to less than ten dynes per centimeter. Another technique for fissioning bubbles is to use neighboring inhomogeneous field regions. Roughly speaking, bubbles will split in two if it is energetically favorable to occupy separate regions of higher field. If a bubble is charged, it can break up into smaller bubbles due to mutual repulsion of the like charges on the original bubble. Alternative techniques for creating small bubbles include forcing the fluid through a small orifice.

Modifications and elaborations of the linear electrode ladder array, shown in FIGS. 2 and 2A will allow chemical species to be transported, positioned, combined, mixed, separated, partitioned into smaller volumes, and used in conjunction with standard chemical synthesis and analysis techniques. The general process will be referred to as dielectrophoretic chemistry. A number of devices for manipulating chemicals will be described and them combined into a dielectrophoretic titrator, as an example of an application of this general technique to a specific reaction cell design.

If one electrode in the linear array of FIG. 2 is inoperative, the flow of material will stop at that electrode. A gate electrode may be provided in this manner between two separated ladder electrode arrays to control the flow of material through the ladder arrays by synchronously operating the ladder and the gate.

Such a gate electrode arrangement is illustrated in FIGS. 3 and 3A in which a first ladder electrode array is separated from a second ladder electrode array by a gate electrode 28. The first ladder array includes a plurality of pairs of opposed diamond-shaped capacitive electrodes 20 while the second ladder array includes a plurality of pairs of opposed generally square-shaped electrodes 22. A pair of insulating plates 24 are disposed between the upper and lower levels of electrodes of both the first and second ladder arrays, and a quantity of higher dielectric material 26 is located between the insulating plates and disposed between the electrodes 20 of the first ladder array. (The insulating plates are assumed to be transparent for ease of explanation).

As already described with respect to FIG. 2A, varying the charges on the electrodes 20 of FIG. 3 can result in movement of the higher dielectric material through the first ladder electrode array. Varying the charge on the gate electrode 28 can be used to control or assist the movement of the material 26. For example, by setting the charges on electrodes 20 and 22 and the gate electrode 28 as shown in FIG. 3A, an electric field exists between the rightmost electrode 20 of FIG. 3 and the gate electrode 28. The dielectrophoretic forces resulting from this electric field cause the end of the dielectric material 26 closest to the gate electrode 28 to extend into the region beneath the gate electrode, as shown in FIGS. 3 and 3A.

In addition to providing flow control of the dielectric material 26 as discussed above, the gate electrode 28 may also be used to separate a small portion or bubble from the larger mass of material 26, as illustrated by FIGS. 3B and 3C. These figures illustrate the gate electrode—ladder array arrangement of FIGS. 3 and 3A except that the polarity on the gate electrode 28 has been reversed. With the polarities on the electrodes 20 and 22 and the gate electrode 28 as illustrated in FIG. 3C, an electric field exists between the gate electrode 28 and the leftmost electrode 22 of the second ladder array. No electric field exists between the gate electrode 28 and the rightmost electrode 20 of the first ladder array. The dielectrophoretic forces resulting from the field between the gate electrode and the second ladder array cause a small portion 30 of the material 26 to separate from the large mass of material and move towards the right, as viewed in FIGS. 3B and 3C. The absence of an electric field between the gate electrode and electrodes 20 of the first ladder array, combined with the surface tension effects in the larger mass of material 26, causes the larger mass of material to recede to the left. The net result of the overall process illustrated in FIGS. 3B and 3C is that a bubble 30 of higher dielectric material has been separated from the bulk of material 26 between the first ladder array and that bubble has moved towards the second ladder electrode array.

It is important that bubbles can be generated with well governed volume, since these bubbles form the unit of measure in a volumetric analysis. The factors tending to cause variation in the bubble sizes are changes in the surface curvature of the reservoir from which the bubbles are fissioned, and variations in the interfacial surface tension and bulk viscosity of the same material. The factors which regulate the bubble size by their inherent design are the thickness of the fluid region, the size of the electrodes, and any orifice which might be installed between the ladder and gate electrodes. In actual operation, it is possible to regulate the bubble size electronically. It has been experimentally observed that, within certain operating limits, larger voltages produce larger bubbles. If the size of the bubbles produced is monitored, for example, optically or capacitively, this information can be fed back to the gate electrode driver to regulate the bubble size produced.

It is noted that standard photolithographic techniques are able to produce electrode arrays capable of manipulating very small quantities of material. For example, a characteristic dimension of 5 mils for the fluid gap and electrode spacing gives bubble sizes on the order of a millionth of a cubic centimeter.

It is necessary to input and output material from the dielectrophoretic manipulator of the present invention. A simple method for ejecting material is to utilize the density difference between the material and the surrounding fluid, as shown in FIG. 4. A ladder electrode array 32 moves material to be ejected between the electrodes to a port 34, where the material drops downwardly through a surrounding fluid 36 until it enters an output reservoir 38. A similar geometry exists for materials which are less dense than the surrounding fluid. In that case the ejected material floats up to an output reservoir.

FIGS. 5 and 5A illustrate a second type of input/output device. An entrance port 40 communicates with the center of an electrode array 42. A material 44, in this case material of a higher dielectric constant than the surrounding fluid, is moved until it drops through the top of the port 40 and into the tube 46. The material 44 will be confined to the region of high electric field between electrodes 42, forming a reservoir from which, for example, bubbles can be fissioned and used in chemical reactions. The reservoir area of the reaction cell may have a larger thickness than most of the reaction cell to increase its storage capacity. In FIG. 5, it is assumed that the port 40 is defined by transparent material 46 for visual clarity of the drawings.

Although reference has been made to bubbles or slabs of material in a surrounding fluid as the typical mode of operation of the dielectrophoretic manipulator described herein, the regions of differing dielectric constant can be as small as a single molecule. Such manipulation requires high electric field strengths and relatively low ambient temperatures to be effective. For example, such conditions allow manipulation of regions of octyl alcohol in a surrounding fluid of n-octane or the separation of chemical species without requiring a phase separation.

The preferred configuration of the present invention allows manipulation of aqueous solutions in inert hydrocarbon surrounding liquids. An example is the manipulation of an acetic acid solution in n-heptane. At higher pressures or lower temperatures, the manipulator operates efficiently with liquid ammonia as the high dielectric solvent.

One of the most useful characteristics of dielectrophoretic manipulation is the ability to transport material to reaction sites or analysis sites by only electronic means. For example, ohmic heaters or thermoelectric coolers can be mounted directly on the containing surfaces of a reaction cell incorporating the present dielectrophoretic manipulator so as to alter the local temperature of that region of the reaction cell. A bubble transported into that region of a reaction cell will undergo a corresponding temperature change. Similarly, the inner surface of the reaction cell might be plated with catalytic material or some region may be packed with a porous plug of catalytic material, which could be selectively utilized by transporting a bubble to that region. A window could be provided through which U.V., visible, or infra-red irradiation of a single bubble can be performed. Such window also would allow spectroscopic measurements of a sample of product material. Ion sensitive electrodes may be mounted in the supporting structure of a reaction cell, thereby providing a direct electrical indication of the pH or concentration of other ions. A gel for electrophoretic separation might be included in a region of the fluid layer.

Many different types of chemical reactions can be performed in a reaction cell embodying the manipulator of the present invention. Examples are exchange, hetero- or homogeneous catalysis, precipitation, distillation, redox, chelate formation, and polymerization. A simple example of a dielectrophoretic reaction cell which will perform a complex titration for $Ca^{++}$ in an aqueous sample will be discussed with respect to FIGS. 6 and 6A.

Figure 6:
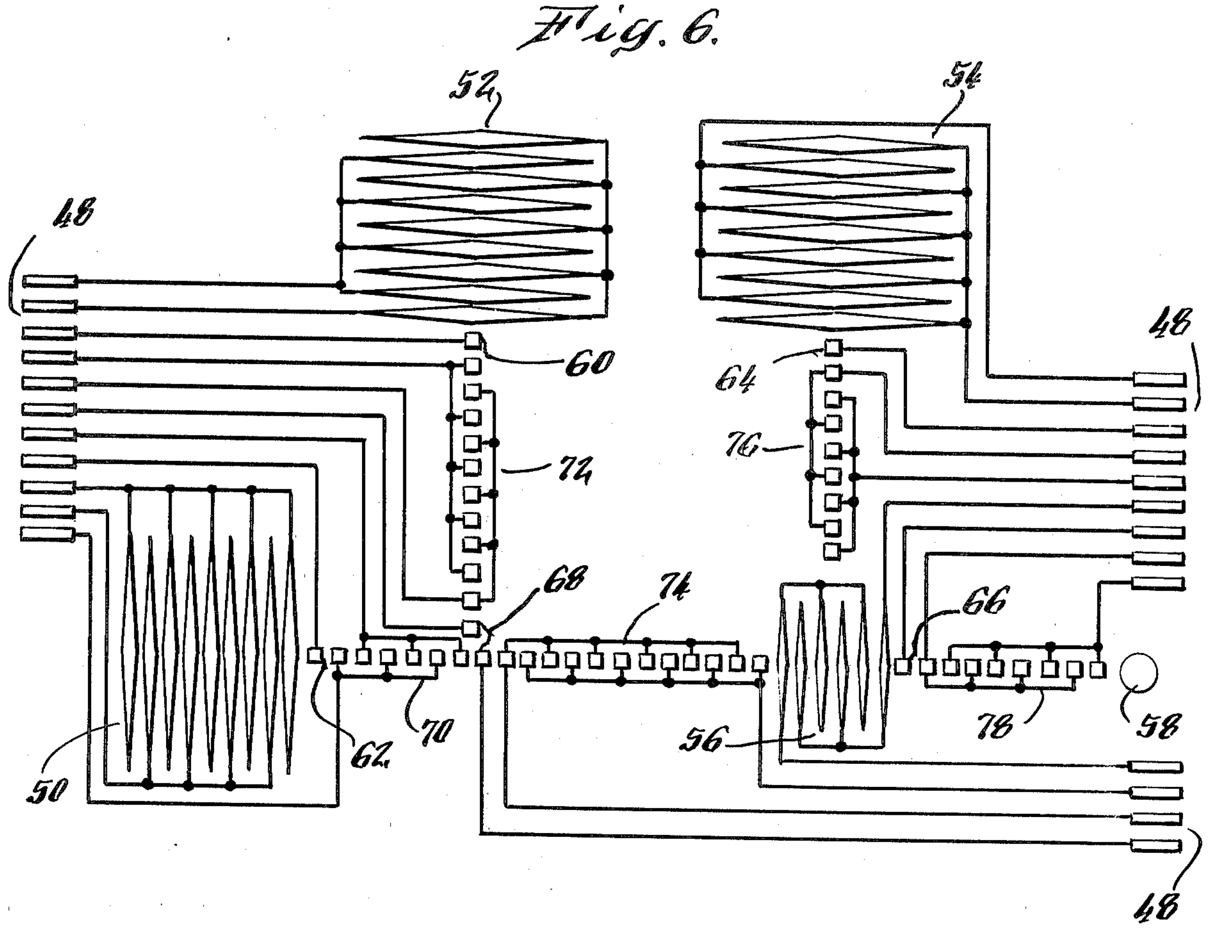
FIG. 6 illustrates a dielectrophoretic titrator in accordance with the present invention.

In FIG. 6, the lower electrode array for a dielectrophoretic titrator is illustrated. Contact pads 48 provide the connections with external control circuits. Electrode array 50 is a reservoir ladder array, such as array 42 shown in FIG. 5. Electrode arrays 52 and 54 in FIG. 6 are reservoir ladder arrays which contain and dispense buffer/indicator and titrant solutions, respectively. Electrode array 56 is a mixing and analysis electrode. Port 58 is a waste exit port, corresponding to port 34 in FIG. 4. Gate electrodes 60, 62, 64 and 66 are gates allowing bubble generation from the buffer/indicator, sample, titrant, and mixing reservoirs, respectively. Two gate electrodes 68 allow bubbles to be directed from the sample reservoir to the buffer/indicator reservoir or to the mixing reservoir, or from the buffer/indicator reservoir to the mixing reservoir. Ladder electrode arrays 70, 72, 74, 76 and 78 are similar to the ladder electrode array shown in FIGS. 2 and 2A. They provide for the movement of bubbles between the various reservoirs.

Figure 6A:
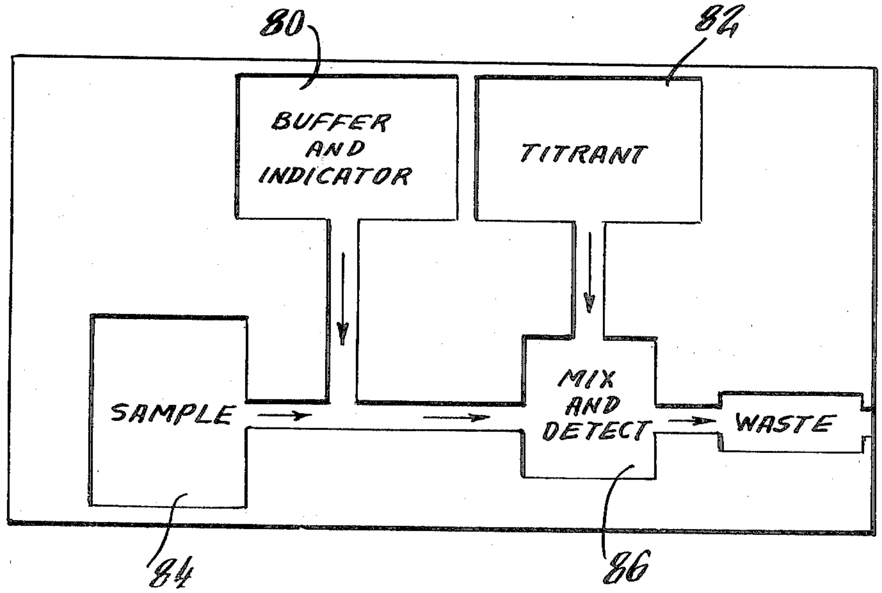
FIG. 6A is a flow diagram illustrating the operation of the dielectrophoretic titrator shown in FIG. 6.

FIG. 6A illustrates a template or spacer to be positioned between two insulating layers, serving to confine the reservoirs and to define the fluid layer thickness. The lower insulator includes the electrode pattern as shown plated on it in the form of a transparent conductor using standard photolithographic techniques. The upper insulator would have a similar electrode array plated on it, (not shown).

The operation of the dielectrophoretic titrator is illustrated generally by the flow diagram of FIG. 6A. A buffer/indicator reservoir 80 contains an ammonia/ammonia chloride solution (buffer for pH=10) and $10^{-6}$F Eriochrome Black T indicator. A titrant reservoir 82 contains a concentrated solution of EDTA (ethylenediaminetetraacetic acid). A sample aqueous solution containing an unknown concentration of $Ca^{++}$ ion is placed in the sample reservoir 84 using, for example, the apparatus and method discussed with respect to FIGS. 5 and 5A. A known number of bubbles of known size are fissioned off of the sample and transported into the mix and detection reservoir 86. A known number of bubbles of known size are fissioned off of the buffer/indicator solution and are also transported to the mix and detection reservoir. Single bubbles of the EDTA titrant are then added to the mixture in the reservoir 86, and the solution in that reservoir is dielectrophoretically driven from one side of the reservoir to the other in order to mix the different solutions. Light of a wavelength of 4800 Angstroms is transmitted through the mix and detection reservoir and monitored. When the transmitted intensity drops down to a characteristic plateau, the titration is complete. Knowledge of the volumes of titrant, the buffer/indicator and the sample added together allows computation of the initial Ca++ concentration in the sample. Finally, the excess sample and material from the mix and detect reservoir are then driven into a discharge chamber or waste reservoir 88 on the far right of FIG. 6A.

A similar sort of device might utilize a calcium ion sensitive electrode rather than an EDTA titration. In that case, the dielectrophoretic manipulator is convenient for alternatively placing bubbles of buffer solution and sample solution between the reference and indicator electrodes for calibration and measurement, respectively.

Other modifications and applications of the above-described dielectrophoretic manipulator will become apparent to those skilled in the art. Accordingly, the above discussion is intended to be illustrative only, and not restrictive of the scope of the invention, that scope being defined by the following claims and all equivalents thereto.

What is claimed is:

1. An apparatus for dielectrophoretic manipulation of at least one chemical species including:

a housing for containing first and second materials, said first and second materials having different dielectric constants, at least one of said first and second materials corresponding to said chemical species to be manipulated, means for applying a non-uniform electrical field to said first and second materials for varying the relative positions of said first and second materials within said housing as a result of dielectrophoretic forces resultant from said applied non-uniform electrical field to transport said at least one chemical species to at least one predetermined location within said housing for performing a selected operation on said chemical species at said predetermined location within said housing, whereby the position of said at least one chemical species is manipulated to said predetermined location within said housing as a result of said dielectrophoretic forces applied thereto.

2. The apparatus of claim 1 further including means for adjusting said non-uniform field applied to said first and second materials for rearranging the relative positions of said first and second materials within said housing.

3. The apparatus of claim 1 further including a plurality of materials within said housing, at least one of said materials having a dielectric constant differing from the dielectric constant of the remainder of said plurality of materials, said remainder of materials corresponding to chemical species to be manipulated within said housing.

4. The apparatus of claim 3 wherein each of said plurality of materials within said housing has a dielectric constant different from the dielectric constant of each of the other materials within the housing.

5. The apparatus of claim 1 wherein said housing includes an analyzer for analyzing said at least one chemical species, said analyzer being positioned in said predetermined location within said housing, whereby said chemical species may be manipulated into said analyzer for analysis thereof.

6. The apparatus of claim 1 wherein said housing includes means for inducing a chemical reaction in said chemical species in said predetermined location within said housing, whereby said dielectrophoretic forces are used to manipulate said chemical species into said predetermined location for inducing a chemical reaction.

7. The apparatus of claim 3 wherein said housing includes means for inducing a chemical reaction between at least two of said materials corresponding to chemical species in said predetermined location within said housing, whereby said dielectrophoretic forces are used to manipulate said at least two materials into said predetermined location for inducing a chemical reaction.

8. The apparatus of claim 1 further including a discharge chamber in communication with said housing, whereby said dielectrophoretic forces resultant from said applied non-uniform electrical field are used to manipulate said chemical species from said housing to said discharge chamber.

9. The apparatus of claim 1 further including an inlet chamber in communication with said housing, whereby dielectrophoretic forces resultant from said applied non-uniform electrical field are used to manipulate said chemical species from said inlet chamber into said housing.

10. The apparatus of claim 6 wherein said means for inducing said chemical reaction includes means for varying the temperature of said chemical species.

11. The apparatus of claim 1 wherein said housing includes means for chemical synthesizing located in said predetermined location, whereby said chemical species in said housing can be manipulated into said predetermined location for performing chemical synthesis.

12. The apparatus of claim 1 further including a plurality of materials corresponding to chemical species to be manipulated, said housing including a mixing chamber defined at said predetermined location therein, whereby said plurality of chemical species can be manipulated into said mixing chamber by said dielectrophoretic forces for mixing thereof.

13. The apparatus of claim 1 wherein said means for applying said non-uniform electrical field includes at least a first pair of opposed electrodes located at a first position within said housing, at least a second pair of opposed electrodes located at a second position within said housing, and a gate electrode disposed between said first and second pairs of opposed electrodes.

14. The apparatus of claim 13 including means for selectively adjusting the charge on said first and second pairs of opposed electrodes and on said gate electrode for controlling the flow of one of said first and second materials though said housing.

15. The apparatus of claim 13 including means for selectively adjusting the charge on said first and second pairs of opposed electrodes and on said gate electrode to separate a portion of one of said first and second materials from the remainder of such material.

16. A method of manipulating at least one chemical species comprising the steps of:

providing first and second materials within a housing, said first and second materials having different dielectric constants, one of said first and second materials corresponding to said at least one chemical species to be manipulated within said housing, applying a non-uniform electrical field to said first and second materials to vary the relative position of said first and second materials within said housing as a result of dielectrophoretic forces resulting from said applied non-uniform electrical field to thereby vary the position of said at least one chemical species within said housing, transporting said at least one chemical species by said dielectrophoretic forces acting thereon to at least one predetermined position within said housing, and performing a predetermined operation on said at least one chemical species at said predetermined location within said housing.

17. The method of claim 16 further including the step of varying said applied non-uniform electrical field to vary the relative positions of said first and second materials within said housing.

18. The method of claim 16 including the step of analyzing said chemical species at said predetermined location within said housing.

19. The method of claim 16 further including the step of inducing a chemical reaction in said chemical species at said predetermined location within said housing.

20. The method of claim 16 further including the step of mixing at least two chemical species at said predetermined location within said housing.

* * * * *